United States Patent
Takahashi

(10) Patent No.: US 12,129,210 B2
(45) Date of Patent: Oct. 29, 2024

(54) YTTRIUM OXIDE-BASED SINTERED BODY AND SEMICONDUCTOR PRODUCTION SYSTEM MEMBER

(71) Applicant: NGK SPARK PLUG CO., LTD., Nagoya (JP)

(72) Inventor: Yuki Takahashi, Nagoya (JP)

(73) Assignee: NITERRA CO., LTD., Nagoya (JP)

(*) Notice: Subject to any disclaimer, the term of this patent is extended or adjusted under 35 U.S.C. 154(b) by 0 days.

(21) Appl. No.: 17/959,891

(22) Filed: Oct. 4, 2022

(65) Prior Publication Data
US 2023/0114637 A1 Apr. 13, 2023

(30) Foreign Application Priority Data
Oct. 7, 2021 (JP) .................. 2021-165301

(51) Int. Cl.
C04B 35/505 (2006.01)
C04B 35/626 (2006.01)
C04B 35/634 (2006.01)
C04B 35/645 (2006.01)

(52) U.S. Cl.
CPC ........ C04B 35/505 (2013.01); C04B 35/6261 (2013.01); C04B 35/6264 (2013.01); C04B 35/62655 (2013.01); C04B 35/62695 (2013.01); C04B 35/63416 (2013.01); C04B 35/645 (2013.01); C04B 2235/3225 (2013.01); C04B 2235/3244 (2013.01); C04B 2235/6567 (2013.01)

(58) Field of Classification Search
CPC .................................................. C04B 35/505
See application file for complete search history.

(56) References Cited

U.S. PATENT DOCUMENTS 3,545,987 A * 12/1970 Anderson ............. C04B 35/505
  313/636
2008/0207432 A1* 8/2008 Hamada ............. C04B 35/6261
  423/263
2016/0104551 A1* 4/2016 Kim .................. C04B 35/62655
  264/682

FOREIGN PATENT DOCUMENTS

CN    111620692 A  †  9/2020
JP    2000-001362 A    1/2000
JP    2006-021990 A    1/2006

OTHER PUBLICATIONS

Jin et al "ZrO2-doped Y2O3 transparent ceramics via slip casting and vacuum sintering", Journal of the European Ceramic Society 30 (2010) 2139-2143.*
English language machine translation of CN 111620692 (pub date 2020).*

* cited by examiner
† cited by third party

Primary Examiner — Mark Kopec
(74) Attorney, Agent, or Firm — Stites & Harbison, PLLC; Jeffrey A. Haeberlin; Trevor T. Graves

(57) ABSTRACT

An yttrium oxide-based sintered body contains yttrium oxide as a main constituent and 0.1 wt % or more and 5.0 wt % or less of zirconium on a $ZrO_2$ basis. Such an yttrium oxide-based sintered body made with yttrium oxide and a certain amount of zirconium oxide therein is highly resistant to corrosive chemicals while maintaining superior resistance to plasma and corrosive gases.

4 Claims, 3 Drawing Sheets

|  | $ZrO_2$ (wt%) | METAL ELEMENT CONTENT (ppm) | | | | PLASMA RESISTANCE | CHEMICAL RESISTANCE |
|---|---|---|---|---|---|---|---|
|  |  | TOTAL | Si | Ca | Na |  |  |
| EXAMPLE 1 | 0.1 | 268 | 28 | 3 | 4 | A | B |
| EXAMPLE 2 | 0.2 | 334 | 31 | 3 | 6 | A | B |
| EXAMPLE 3 | 0.5 | 449 | 30 | 4 | 11 | A | A |
| EXAMPLE 4 | 1.0 | 422 | 33 | 4 | 10 | A | A |
| EXAMPLE 5 | 5.0 | 505 | 33 | 4 | 12 | B | A |
| COMPARATIVE EXAMPLE 1 | NONE | 361 | 29 | 3 | 8 | A | C |
| COMPARATIVE EXAMPLE 2 | 8.0 | 611 | 34 | 4 | 14 | C | B |

FIG. 3

| | ZrO$_2$ (wt%) | METAL ELEMENT CONTENT (ppm) | | | | PLASMA RESISTANCE | CHEMICAL RESISTANCE |
|---|---|---|---|---|---|---|---|
| | | TOTAL | Si | Ca | Na | | |
| EXAMPLE 1 | 0.1 | 268 | 28 | 3 | 4 | A | B |
| EXAMPLE 2 | 0.2 | 334 | 31 | 3 | 6 | A | B |
| EXAMPLE 3 | 0.5 | 449 | 30 | 4 | 11 | A | A |
| EXAMPLE 4 | 1.0 | 422 | 33 | 4 | 10 | A | A |
| EXAMPLE 5 | 5.0 | 505 | 33 | 4 | 12 | B | A |
| COMPARATIVE EXAMPLE 1 | NONE | 361 | 29 | 3 | 8 | A | C |
| COMPARATIVE EXAMPLE 2 | 8.0 | 611 | 34 | 4 | 14 | C | B |

YTTRIUM OXIDE-BASED SINTERED BODY AND SEMICONDUCTOR PRODUCTION SYSTEM MEMBER

BACKGROUND OF THE INVENTION

1. Field of the Invention

The present invention relates to an yttrium oxide-based sintered body and a semiconductor production system member made with it.

2. Description of the Related Art

In the related art, yttrium oxide ($Y_2O_3$) sintered bodies are used as semiconductor production system members, those for use in plasma environments in particular, by virtue of their superior plasma resistance. High-purity yttrium oxide sintered bodies are used as semiconductor production system members so that workpieces are not contaminated with impurities (e.g., particles).

PTL 1 addresses a disadvantage of yttria ceramics containing trace amounts of metal constituents. The trace amounts of metal constituents tend to segregate to grain boundaries between yttria crystals and are more corrodible to a plasma atmosphere than yttria crystals. Exposing an yttria ceramic component containing trace amounts of metal constituents to a plasma atmosphere, therefore, causes crystal grain boundaries to be corroded first. Once grain boundaries between near-surface yttria crystals are corroded, the yttria crystals come off, adhering as dust to the silicon wafer. To address this, the publication discloses an yttria ceramic component having a high purity of 99.9 wt % or more. The amounts of trace metal constituents in this component are as follows: Si, 100 ppm or less; Ca, 20 ppm or less, both on a mass basis.

PTL 2 discloses a corrosion-resistant ceramic material. This material is based on an oxide containing at least one of the elements in group 3A of the periodic table and at least one of the elements in group 4A of the periodic table. The publication mentions Y, La, and Yb as examples of group-3A elements and Ti and Zr as examples of group-4A elements, stating that the amount of group-4A elements on an oxide basis is 0.03 to 70 wt % of the material as a whole.

CITATION LIST

Patent Literature

PTL 1: Japanese Unexamined Patent Application Publication No. 2006-021990
PTL 2: Japanese Unexamined Patent Application Publication No. 2000-001362

SUMMARY OF THE INVENTION

Although yttrium oxide sintered bodies are members highly resistant to a plasma gas, they are not so resistant to acidic chemicals, such as nitric acid and hydrochloric acid. PTL 1, disclosing a high-purity yttrium oxide sintered body, focuses on increasing plasma resistance but does not take into account chemical resistance.

In PTL 2, the range of amounts of group-4A elements in the corrosion-resistant ceramic material is very broad, i.e., 0.03 to 70 wt %. When present in large amounts, the elements in group 4A segregate in the sintered body easily. The segregated portions exhibit decreased corrosion resistance and are selectively etched easily. Furthermore, PTL 2 also focuses on increasing the plasma resistance of the ceramic material but does not take into account the chemical resistance.

Accordingly, it is an object of the present invention to provide an yttrium oxide-based sintered body highly resistant to corrosive chemicals while maintaining superior resistance to plasma and corrosive gases, and also to provide a semiconductor production system member.

(1) To achieve this object, an yttrium oxide-based sintered body according to an aspect of the present invention contains yttrium oxide as a main constituent and 0.1 wt % or more and 5.0 wt % or less of zirconium on a $ZrO_2$ basis.

Such an yttrium oxide-based sintered body made with yttrium oxide and a certain amount of zirconium oxide therein is highly resistant to corrosive chemicals while maintaining superior resistance to plasma and corrosive gases.

(2) The yttrium oxide-based sintered body according to the aspect of the present invention, furthermore, may contain 0.5 wt % or more and 1.0 wt % or less of the zirconium on a $ZrO_2$ basis.

Adjusting the amount of zirconium oxide in the yttrium oxide-based sintered body to such a range allows the balance between the resistance to plasma and corrosive gases and the resistance to corrosive chemicals to be improved.

(3) In the yttrium oxide-based sintered body according to the aspect of the present invention, furthermore, a total amount of metal elements excluding the yttrium and the zirconium may be 1000 ppm or less, and, of the metal elements, an amount of each of Si, Ca, and Na may be 150 ppm or less.

Minimizing the amounts of metals other than yttrium and zirconium in such a way allows the corrosion resistance of the yttrium oxide-based sintered body to be improved to a level comparable to that of high-purity (99.9% or more) yttrium oxide sintered bodies.

(4) A semiconductor production system member according to an aspect of the present invention includes the yttrium oxide-based sintered body according to any of (1) to (3) above.

This makes the semiconductor production system member resistant to plasma and corrosive gases and resistant to corrosive chemicals at the same time.

Thus, according to an aspect of the present invention, it is possible to achieve high resistance to corrosive chemicals while maintaining superior resistance to plasma and corrosive gases.

BRIEF DESCRIPTION OF THE DRAWINGS

FIG. 3 is a table presenting various evaluation results for sintered bodies of Examples and Comparative Examples.

DESCRIPTION OF THE PREFERRED EMBODIMENTS

Figure 1:
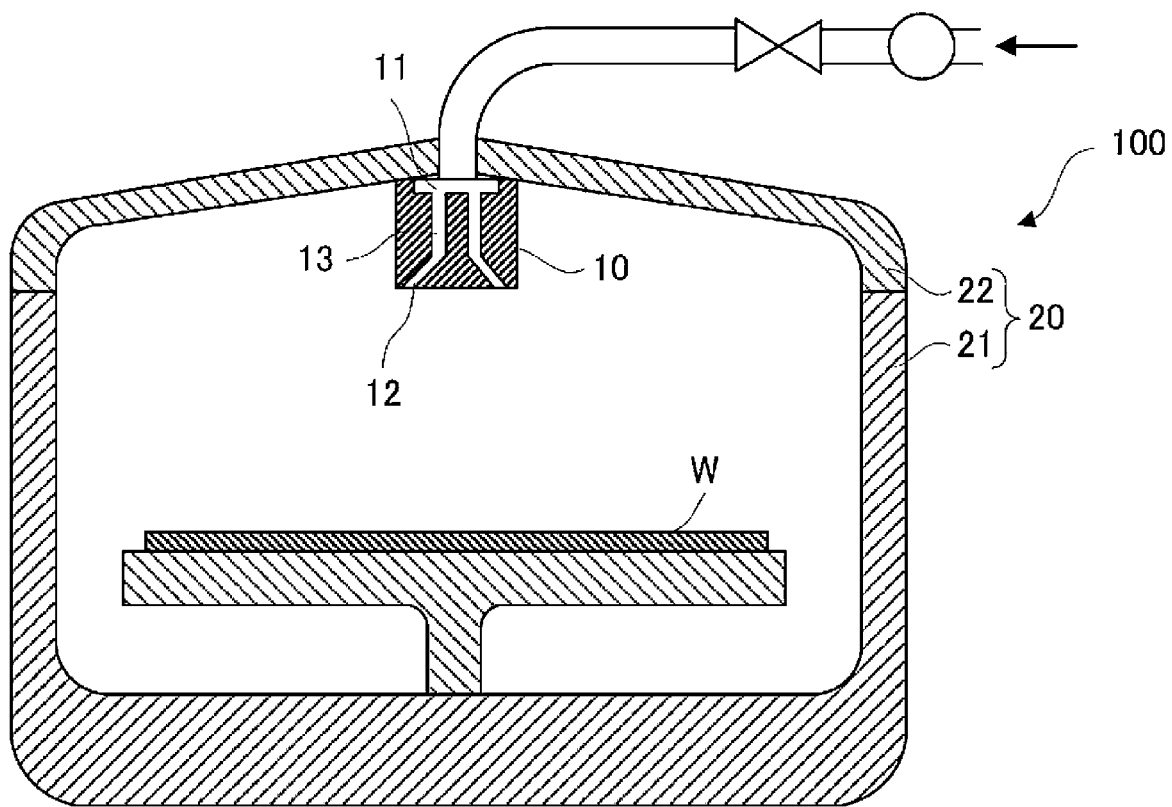
FIG. 1 is a schematic sectional view illustrating an exemplary use of a semiconductor production system member according to an embodiment of the present invention.

Embodiments of the present invention will now be described with reference to the drawings. To facilitate an understanding of the description, identical structural elements in the drawings are denoted by the same reference numerals and described only once. In structure diagrams, the sizes of the elements are conceptual; the elements are not necessarily drawn to scale.

Structure of Yttrium Oxide-Based Sintered Body An yttrium oxide-based sintered body according to an embodiment of the present invention contains yttrium oxide ($Y_2O_3$) as a main constituent and 0.1 wt % or more and 5.0 wt % or less of zirconium on a $ZrO_2$ basis. Containing yttrium oxide as a main constituent means containing 94.5 wt % or more and less than 99.9 wt % of yttrium oxide. Preferably, the total amount of $Y_2O_3$ and $ZrO_2$ in the yttrium oxide-based sintered body is 99.5 wt % or more, more preferably 99.9 wt % or more.

Such an yttrium oxide-based sintered body made with yttrium oxide and a certain amount of zirconium oxide therein is highly resistant to corrosive chemicals while maintaining superior resistance to plasma and corrosive gases.

If the zirconium oxide content is less than 0.1 wt %, the improvement in chemical resistance is small. If the zirconium oxide content exceeds 5.0 wt %, it is more likely that the sintered body contains pores due to low sinterability. Too many pores in the sintered body decrease its plasma resistance. Furthermore, zirconium oxide can segregate, and the segregation of zirconium oxide decreases plasma resistance. For these reasons, the zirconium oxide content is in the above range.

Preferably, the zirconium oxide content is 0.5 wt % or more. Preferably, furthermore, the zirconium oxide content is 1.0 wt % or less. Adjusting the amount of zirconium oxide in the yttrium oxide-based sintered body to such a range allows the balance between the resistance to plasma and corrosive gases and the resistance to corrosive chemicals to be improved.

Preferably, the yttrium oxide-based sintered body has the zirconium oxide completely dissolved in the yttrium oxide. Because the yttrium oxide has excellent resistance to plasma and corrosive gases. When completely dissolved in the yttrium oxide, the zirconium oxide is not present as crystals but is dissolved in the yttrium oxide crystals, without altering the structure of the yttrium oxide crystals. Thus, the sintered body in that case is well-balanced between resistance to chemicals and resistance to corrosive gases.

Complete dissolution of the zirconium oxide in the yttrium oxide can be confirmed as follows. First, a cross-section of the yttrium oxide-based sintered body is analyzed by glow discharge mass spectrometry (GD-MS) to verify that the elements in the cross-section include yttrium and zirconium. Separately, the crystal structure of the same cross-section is examined by XRD to verify that a crystal phase of yttrium oxide is detected, a crystal phase of zirconium oxide is not detected, and a crystal phase of yttrium-zirconium composite oxide is not detected. Thus, complete dissolution of the zirconium oxide in the yttrium oxide can be confirmed.

Preferably, in the yttrium oxide-based sintered body, the total amount of metal elements excluding yttrium and zirconium is 1000 ppm or less. Limiting the total amount of metal elements excluding yttrium and zirconium to 1000 ppm or less ensures sufficient plasma resistance. Examples of metal elements other than yttrium and zirconium include Si, Ca, Na, Mg, Ti, Cr, Fe, Ni, Cu, and P. It should be noted that metal elements herein include metalloid elements, such as Si and P.

Such trace metals are easily condensed in the yttrium oxide-based sintered body, primarily at its grain boundary layers, and are more corrodible to plasma environments than yttrium oxide and zirconium oxide. If the trace metal constituents are corroded first, grains come off in the corroded grain boundary portions, decreasing plasma resistance. In light of this, it is preferred that the amount of metal elements excluding yttrium and zirconium be as small as possible. It is, therefore, preferred that the amount of metals excluding yttrium and zirconium be 500 ppm or less, more preferably 300 ppm or less. Ensuring that the amount of trace metals is in such a range requires implementing control to prevent contamination with impurities from feedstock powders or the production process.

Preferably, of the metal elements in the yttrium oxide-based sintered body excluding yttrium and zirconium, the amount of each of Si, Ca, and Na is 150 ppm or less. It is important to control the amounts of Si, Ca, and Na because these elements have a particularly large impact on plasma resistance. More preferably, the amount of each of Si, Ca, and Na is 100 ppm or less, even more preferably 50 ppm or less.

Minimizing the amounts of metal elements other than yttrium and zirconium in such a way allows the plasma resistance of the yttrium oxide-based sintered body to be improved to a level comparable to that of high-purity (99.9% or more) yttrium oxide sintered bodies. The amounts of metal elements in the yttrium oxide-based sintered body can be measured by glow discharge mass spectrometry (GD-MS).

Preferably, furthermore, the yttrium oxide-based sintered body has a relative density of 90% or more. Having such a sufficiently high relative density, the yttrium oxide-based sintered body has high plasma resistance, and also has superior strength as a sintered body and is therefore suitable for use even as a large-sized member.

The relative density of the yttrium oxide-based sintered body can be expressed as (sintered body density/theoretical density)×100(%). The theoretical density is the density of yttrium oxide alone (5.01 $g/cm^3$), and the sintered body density is the density of the yttrium oxide-based sintered body as measured by the Archimedes method.

Structure of Semiconductor Production System Member

A semiconductor production system member according to an embodiment of the present invention will now be described. FIG. 1 is a schematic sectional view illustrating an exemplary use of a semiconductor production system member according to an embodiment of the present invention. The semiconductor production system member according to the embodiment of the present invention is suitable for use as, for example, a gas nozzle 10 or a reactor body 21 or lid member 22 of a reactor 20 for a plasma system 100, such as a film-forming system for forming a thin film on a substrate W (e.g., a semiconductor wafer or glass substrate) or an etching system for micromachining of the substrate W in a semiconductor or liquid-crystal production process.

For example, in the case of a film-forming system, a thin film may be formed on the substrate W by plasma-enhanced chemical vapor deposition (CVD), in which the system introduces source gases including a corrosive gas through the gas nozzle 10 into the reactor 20 and creates a plasma from the source gases. In the case of an etching system, the substrate W may be micromachined by introducing a halogen-based corrosive gas as a source gas through the gas nozzle 10 into the reactor 20 and creates a plasma as an etching gas from the corrosive gas.

The gas nozzle 10 has a gas inlet 11 through which a corrosive gas and other gases are fed from a gas feeder (not illustrated); gas outlets 12 through which the gases are ejected into the reactor 20; and nozzle channels 13 via which the gas inlet 11 and the gas outlets 12 communicate with each other.

The semiconductor production system member according to the embodiment of the present invention includes a portion to be exposed to a corrosive gas or corrosive chemical. In the example illustrated herein, the semiconductor production system member forms the portion of the gas nozzle 10 to be exposed to a corrosive gas, e.g., at least part of the portion including the nozzle channels 13 and the portion exposed inside the reactor 20. The semiconductor production system member, however, may form the entire gas nozzle 10. Alternatively, the semiconductor production system member may be, for example, the reactor body 21 or lid member 22 of the reactor 20 or may be part of it.

Method for Producing Yttrium Oxide-Based Sintered Body

Figure 2:
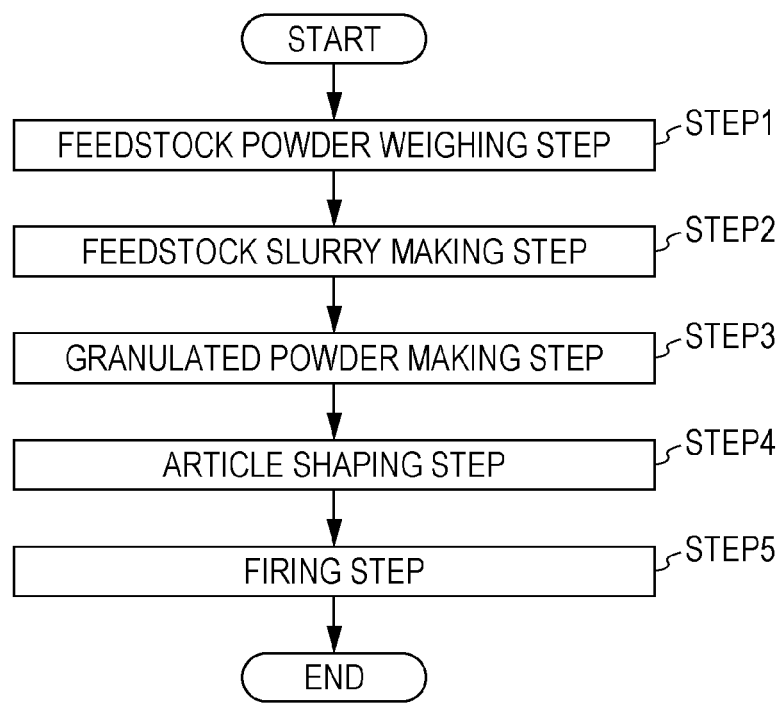
FIG. 2 is a flowchart illustrating an exemplary production process for an yttrium oxide-based sintered body according to an embodiment of the present invention.

A method for producing an yttrium oxide-based sintered body according to an embodiment of the present invention will now be described. FIG. 2 is a flowchart illustrating an exemplary production process for an yttrium oxide-based sintered body according to an embodiment of the present invention.

First, an yttrium oxide powder and a zirconium oxide powder are prepared as feedstock powders for the yttrium oxide-based sintered body. Preferably, each powder has a purity of 99.9% or more, more preferably 99.99% or more. Preferably, each powder has an average particle size of 0.1 μm or more and 10 μm or less. Then the powders are weighed such that the zirconium content on a $ZrO_2$ basis in the finished yttrium oxide-based sintered body is a predetermined value in the range of 0.1 wt % or more and 5.0 wt % or less (STEP 1).

Then the feedstock powders are mixed together. For example, the powders are put into a pot together with a binder (e.g., PVA) and milled and mixed together by wet mixing in a ball mill to give a feedstock slurry (STEP 2). Deionized water and a dispersant may optionally be used to prepare the feedstock slurry. The balls in the ball mill can be, for example, resin balls. The duration of mixing can be, for example, 20 hours.

Then the slurry obtained in the mixing step is dried and granulated (STEP 3). An example of a method for obtaining a granulated powder from the slurry is to remove the solvent from the slurry to obtain a powder by drying the slurry while warming it in hot water and then sieve the resulting powder. A spray dryer can also be used.

Then the granulated powder obtained in the granulating step is shaped into an article (STEP 4), for example, by placing and pressing the granulated powder in a mold. Pressing can be performed by uniaxial pressing, cold isostatic pressing (CIP), hot pressing, or another known pressing process. For pressing, the shaping pressure can be, for example, 98 MPa.

Then the article is fired (STEP 5). Firing can be performed at a temperature of 1600° C. or above and 2000° C. or below in an oxidative atmosphere or vacuum, giving an yttrium oxide-based sintered body. Preferably, the duration of firing is 1 hour or more and 20 hours or less. A degreasing step may optionally be added before the firing step. The yttrium oxide-based sintered body, furthermore, may be subjected to a densifying step by compressing it by HIP.

Through such a process, an yttrium oxide-based sintered body can be produced that combines resistance to plasma and corrosive gases with resistance to corrosive chemicals.

EXAMPLES AND COMPARATIVE EXAMPLES

Example 1

An yttrium oxide feedstock powder (purity, 99.9%; average particle size, 1 μm) and a zirconium oxide ($ZrO_2$) feedstock powder (purity, 99.99%; average particle size, 0.1 μm) were weighed so that the finished yttrium oxide-based sintered body would contain 0.1 wt % $ZrO_2$. The weighed feedstock powders were then put into a pot together with 2.0% by mass of a PVA binder (as a percentage to the total mass of the feedstock powders alone), 0.3% by mass of a water-soluble acrylic dispersant (as a percentage to the total mass of the feedstock powders alone), and an appropriate amount of deionized water and wet-mixed in a ball mill to give a feedstock slurry. Then this feedstock slurry was dried and granulated using a spray dryer. The granulated powder was put into a mold and shaped into an article by cold isostatic pressing (CIP). Then the resulting article was fired at a temperature of 1700° C. in an air atmosphere for 10 hours, giving an yttrium oxide-based sintered body of Example 1.

Example 2

An yttrium oxide-based sintered body of Example 2 was produced under the same conditions as in Example 1, except that the feedstock powders were weighed such that the $ZrO_2$ content of the sintered body was 0.2 wt %.

Example 3

An yttrium oxide-based sintered body of Example 3 was produced under the same conditions as in Example 1, except that the feedstock powders were weighed such that the $ZrO_2$ content of the sintered body was 0.5 wt %.

Example 4

An yttrium oxide-based sintered body of Example 4 was produced under the same conditions as in Example 1, except that the feedstock powders were weighed such that the $ZrO_2$ content of the sintered body was 1.0 wt %.

Example 5

An yttrium oxide-based sintered body of Example 5 was produced under the same conditions as in Example 1, except that the feedstock powders were weighed such that the $ZrO_2$ content of the sintered body was 5.0 wt %.

Comparative Example 1

A totally yttrium oxide sintered body of Comparative Example 1 was produced under the same conditions as in Example 1, except that no zirconium oxide was added.

Comparative Example 2

A sintered body of Comparative Example 2 containing yttrium oxide and $ZrO_2$ was produced under the same conditions as in Example 1, except that the feedstock powders were weighed such that the $ZrO_2$ content of the sintered body was 8.0 wt %.

Evaluation Methods

Test specimens cut out of the sintered bodies of the Examples and Comparative Examples were subjected to the following measurements.

(1) Plasma Resistance Test

A test specimen was prepared for each Example or Comparative Example. One side of the test specimen was polished to a mirror finish, and part of the polished side was masked with polyimide tape. The masked test specimen was set in a plasma etching system capable of RIE and etched by RIE under the following conditions: etching gas, $NF_3$; duration of plasma exposure, 4 hours; radio-frequency power, 2000 W. The corrosion depth after the plasma treatment was checked. The article was rated excellent (A) if the corrosion depth was 0.7 μm or less, or good (B) if the corrosion depth was more than 0.7 μm and 0.8 μm or less, both of which are acceptable. If the corrosion was deeper than 0.8 μm, the article was rated poor (C), which is unacceptable.

(2) Chemical Resistance Test

A test specimen was prepared for each Example or Comparative Example. The test specimen was immersed in a hydrohalic acid in a container for a predetermined period of time and was then polished and inspected for microscopic surface flaws by SEM observation (magnification, 1000×) of the surface condition. First, the test specimens were polished and ground in the same batch and were then put into a container with a hydrohalic acid therein prepared in advance and immersed in the chemical. After 6 hours, the surfaces of the samples were observed with an SEM. Any sample found to have a flaw at this point in time was rated poor, which is unacceptable. The samples found to be intact were immersed in the chemical again, and their surfaces were observed with an SEM after 18 hours (a total of 24 hours). The samples found to have a flaw at this point in time were rated good, and those found to be still intact were rated excellent, both of which are acceptable.

Overall, the rating criteria were as follows: the samples were rated excellent (A) if no flaw was observed after 24 hours of immersion in a hydrohalic acid, or good (B) if a flaw was observed after more than 6 hours and within 24 hours of immersion, both of which are acceptable, or were rated poor (C) if a flaw was observed within 6 hours of immersion, which is unacceptable.

(3) Zirconium Oxide and Metal Impurity Contents of Sintered Body

For each test specimen, the amounts of zirconium oxide and other metal elements in the sintered body were measured by glow discharge mass spectrometry (GD-MS).

Evaluation Results

The table in FIG. 3 presents the various evaluation results for the sintered bodies of the Examples and Comparative Examples. As shown in the table in FIG. 3, Examples 1 to 5, which were yttrium oxide-based sintered bodies according to embodiments of the present invention, were rated B or better in plasma resistance and chemical resistance.

Of the Examples, Examples 3 and 4 displayed excellent plasma resistance and chemical resistance, revealing that it is preferred that the zirconium oxide content on a $ZrO_2$ basis of the yttrium oxide-based sintered body be 0.5 wt % or more and 1.0 wt % or less.

The table in FIG. 3 also indicates that Comparative Example 1, containing no zirconium oxide, was rated good in plasma resistance but poor in chemical resistance. Comparative Example 2, containing zirconium oxide in an amount beyond the range specified herein, was rated good in chemical resistance but poor in plasma resistance. The sintered bodies of Comparative Example 2 had many pores and microscopic cracks therein. This is believed to have caused the poor plasma resistance. Thus, it was found that it is preferred that the zirconium content on a $ZrO_2$ basis of the yttrium oxide-based sintered body be 5.0 wt % or less.

An X-ray diffraction (XRD) crystal-phase observation of the yttrium oxide-based sintered bodies of the Examples detected only a crystal phase of yttrium oxide; neither a crystal phase of zirconium oxide nor a crystal phase of yttrium-zirconium composite oxide was found. High-power XRD also detected neither a crystal phase of zirconium oxide nor a crystal phase of yttrium-zirconium composite oxide, indicating that the yttrium oxide-based sintered bodies of the Examples had the added zirconium oxide completely dissolved in the yttrium oxide. This is believed to be the reason for the high plasma resistance and chemical resistance of an yttrium oxide-based sintered body according to an embodiment of the present invention.

The above results demonstrated that an yttrium oxide-based sintered body according to an embodiment of the present invention exhibits sufficiently high plasma resistance and chemical resistance. The results also demonstrated that a semiconductor production system member according to an embodiment of the present invention is highly resistant to plasma and chemicals and is therefore suitable for use as a member forming a portion that can be exposed to both plasma and chemicals.

It should be understood that the present invention is not limited to the above embodiments but encompasses various variations and equivalents that fall within its spirit and scope. The structures, shapes, numbers, locations, sizes, and other details of the structural elements illustrated in the drawings are for illustrative purposes only and can be changed as appropriate.

What is claimed is:

1. An yttrium oxide-based sintered body comprising:
   yttrium oxide as a main constituent; and
   0.5 wt % or more and 1.0 wt % or less of zirconium on a $ZrO_2$ basis such that a balance between a resistance to plasma and corrosive gases and another resistance to corrosive chemicals is improved,
   whereby the body is used as a member including a portion exposed to a corrosive gas or a corrosive chemical.

2. The yttrium oxide-based sintered body according to claim 1, wherein:
   a total amount of metal elements excluding the yttrium and the zirconium is 1000 ppm or less; and
   of the metal elements, an amount of each of Si, Ca, and Na is 150 ppm or less.

3. A semiconductor production system member comprising the yttrium oxide-based sintered body according to claim 2.

4. A semiconductor production system member comprising the yttrium oxide-based sintered body according to claim 1.

* * * * *